March 12, 1940.   M. O. SEM   2,193,434
ELECTRODE WITH SLIDE CONTACTS
Filed April 19, 1938    2 Sheets-Sheet 2

Inventor:
MATHIAS ÖVROM SEM by
Attorneys

Patented Mar. 12, 1940

2,193,434

UNITED STATES PATENT OFFICE 2,193,434

ELECTRODE WITH SLIDE CONTACTS

Mathias Ovrom Sem, Oslo, Norway, assignor to Det norske Aktieselskab for Elektrokemisk Industri, Oslo, Norway Application April 19, 1938, Serial No. 202,896
In Norway April 8, 1937

8 Claims. (Cl. 13—18)

This invention relates to electrodes which are baked in the furnace in which they are used. For such electrodes it has been suggested to mould the electrode in a special iron mould which may be in the shape of a tube through which the electrode, if desired by means of pressure, is allowed to move downwards into the furnace. The mould may then be arranged stationary and if desired connected with the furnace roof. It may at the same time serve for supply of electric current to the electrode.

Such a construction would possess considerable advantage, especially in closed furnaces, as the mould may easily be connected gastight with the roof. The electrode itself is shaped by the inner surfaces and therefore completely fills the mould so that a gastight introduction is obtained. With the usual carbon electrodes it is practically impossible to obtain a gastight connection which at the same time allows easy displacement of the electrode in the electrode holder.

The practical application of above mentioned methods has met with very great practical difficulties which it has hitherto been impossible to overcome.

The difficulty consists in the fact that the electrode mass which is crude and unbaked in the upper part of the mould but is baked before it reaches the lower edge of the mould, during the baking is coked on the mould and will stick thereto. After some time it is therefore impossible to make the electrode slide in the mould. It is also difficult to make the electrode move as a whole as the lower baked or coked part of the electrode will easily separate from the upper unbaked part and will fall out and break. The upper and only half coked electrode will then remain in the mould. It has been tried to improve this by pressing the electrode through the mould so that the electrode is not subjected to any strain until it is baked. The upper part of the electrode may however not be subjected to pressure as it is semi-liquid so that any pressure will immediately increase the friction between mass and mould.

Applicant has found that the foregoing difficulties may be avoided by employing a casing or mold for the electrode and providing the electrode with contact means which surround the major portion of the electrode mass and baked electrode in the casing, said contact means being firmly attached to the electrode in the baked portion thereof by the baking of the electrode mass and being laterally extensible by the electrode mass by which during the baking of the electrode they are pressed into firm contact with the inside of the casing, and with the electrode are slidable through the casing. With such a construction and arrangement the current is preferably supplied to the electrode from the casing itself, passing through the casing and through the contact means into the electrode mass and the baked electrode.

The contact means are thus interposed between the casing and the raw and partially baked electrode mass for the most part while the electrode is being supplied with current and prevent the electrode mass in its raw and partially baked condition from coking onto the interior of the casing.

The above mentioned sliding contact means may be made of carbon or graphite. They are in most cases suitably made of metal, preferably iron. Thereby the electrode is at the same time reinforced so that it is kept well together throughout its whole length. The reinforcement may also be used for exerting pressure downwards on the electrode and for effecting a safe suspension thereof. In the accompanying drawings which are to be understood as purely illustrative and not limitative, one form of this invention is shown as applied to an electrode of circular cross-section employed for use in a closed type electric furnace. In the said drawings:

Figure 1:
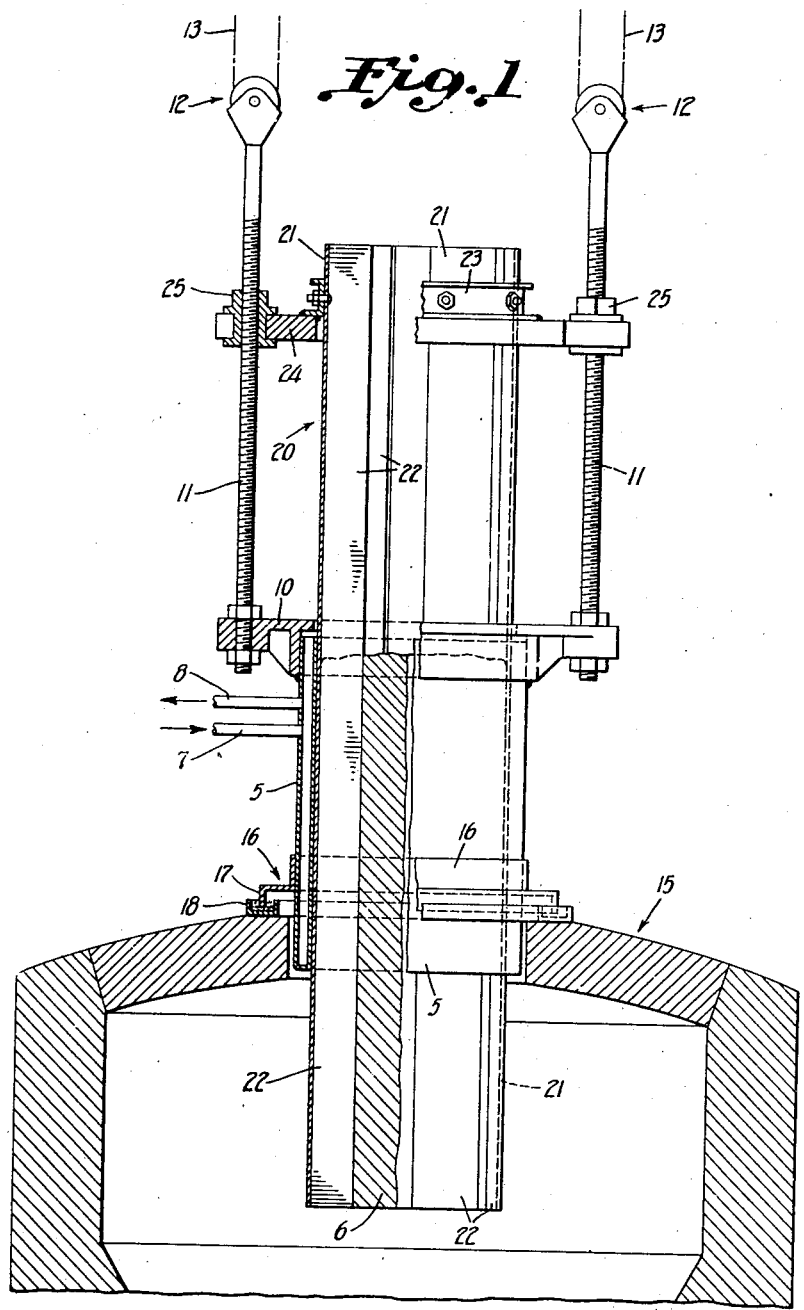
Figure 1 is a vertical sectional view of the form of my invention selected to illustrate the same, the electrode, its casing or mold, sliding contacts and supporting parts to the right of the figure being shown in elevation.
Figure 2:
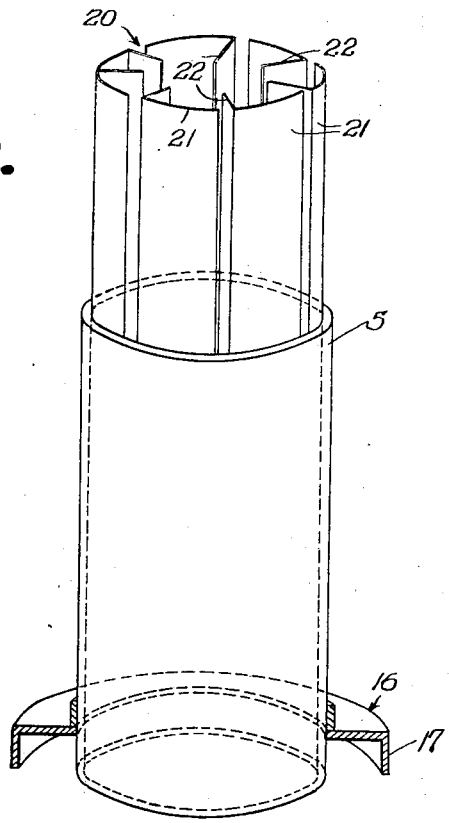
Fig. 2 is a detail perspective of the casing or mold and contacts of Fig. 1 illustrating the ring of the sand-lock of Fig. 1 later to be described in vertical section.
Figure 3:
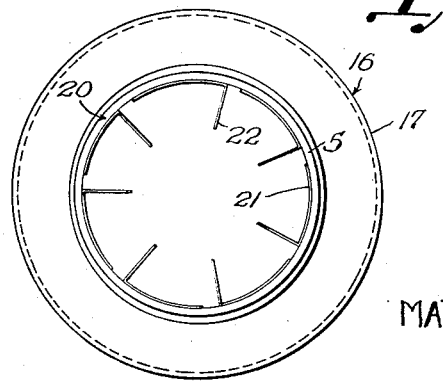
Fig. 3 is a detail top plan of the casing or mold, sliding contacts and sand-lock ring of Fig. 1.

In the construction illustrated the casing 5 for the electrode 6 is shown as a hollow cylindrical mold of electrically conductive metal, suitably water cooled more particularly at the lower end in a manner well known to the art and therefore not specifically illustrated, the water entering the casing through pipe 7 and leaving through pipe 8.

The top of the casing 5 is integrally connected with a circumferential ring 10 as by welding; and this ring is suitably supported by a pair of threaded diametrically opposite link members or rods 11 to which the ring 10 is firmly bolted. The rods 11 are in turn each supported by a pulley 12, the chains 13 of the pulleys being suitably carried on a superstructure not illustrated and affording means for raising and lowering the casing 5.

The bottom of the casing 5 extends well into the top or cover member of a closed electric furnace 15. The casing just above the top of the furnace carries tightly but slidably attached thereto a circumferential ring 16 having a downwardly projecting annular flange 17, which extends into a circular trough 18 mounted on the top of the furnace and plentifully supplied with sand so as with the ring 16 to constitute a sand-lock between the furnace and the casing and prevent the escape of gases from the furnace upwardly around the casing.

The sliding contact means 30 heretofore referred to are illustrated as formed by a plurality of thin metallic strips 21 which may, for example, be of about 1 mm. thickness, each provided with an inwardly extending rib 22. These individual contact members are supported above by a circular ring 23 to which they are individually bolted. And the ring 23 is in turn supported by and rigidly attached to a second and larger ring 24 which surrounds the contact members at the top and is carried by nuts 25 threaded onto the rods 11, the nuts 25 having rotatable connection with the ring 24.

The sliding contacts 20 extend downwardly from their supporting ring 23 through the casing 5 to the lower end of the electrode 6 and the metal of which they are made, e. g., iron, is of such character that when the raw electrode mass is supplied to the casing 5 at the top thereof in well known manner the strips 21 of the contacts, which are initially preferably arcuate, are pressed into firm contact with the interior of the casing 5 so as to form a substantially gas-tight connection therewith and to prevent sparking between the contacts and the casing. This flexibility of the contact members 20 is heretofore referred to as "extensible." Preferably when thus pressed into contact with the interior of the casing 5 the adjacent edges of the strips 21 are slightly separated. The engagement between the casing 5 and contact strips 21 and between the casing and those portions of the electrode between the adjacent edges of the contact strips permits the electrode with its contact strips to slide through the casing.

The mounting of the sliding contacts 20 above described affords means for controlling the sliding of the electrode and contacts through the casing 5, and by screwing the nuts 25 downwardly toward the ring 10 pressure may be exerted on the electrode and contacts to force the same through the casing in the event this becomes necessary.

The sliding contact means 20 need not of necessity be provided with inwardly projecting ribs, and if desired may be formed with a single strip 21 rather than with a plurality of strips. Such single strip should preferably have its adjacent side edges slightly spaced apart, though if desired the side edges may overlap if sufficient relative movement between them is provided to afford the lateral extensibility heretofore set forth.

It must be mentioned that the interior of the casing 5 and the sliding surfaces of the contacts 20 will be moistened by tar in the upper part of the electrode. This will however not prevent sliding of the electrode in the casing. It will strongly help to make the whole construction gas-tight.

On account of friction in the electrode casing 5 a part of the electrode weight, for example 30–50% will be carried by the casing while the rest or about 50–70% will be carried by the chains 13 which are in turn suitably connected with electric winches not shown.

It should be mentioned that the mould if desired may be constructed as a tube whose lower end reaches down into the furnace through the roof. If difficulties should arise during operation on account of the electrode sticking in the casing, the casing may without disturbing the operation follow the electrode down into the furnace until the electrode again becomes loosened and the sliding of the electrode in the mould may start again. A new section is then simply added to the mould corresponding to the lowering of the electrode and the operation may be continued without disturbance. It is, however, impossible to keep the oven quite tight during these displacements, but as they only last a short time this is of little importance.

The mould may be made of iron, preferably of such composition that it has little tendency to become welded to the sliding contacts 20 or still better of a material having good electric conductivity as for instance copper or brass.

A special advantage is attained in regulating the oven purely by voltage adjustment so that the electrode is only moved downwards when electrode consumption makes this necessary. The mould then remains at the same place all the time and may therefore be rigidly connected with bus bars from the transformer without the use of flexible cables. Hereby the electrical conditions are very materially improved so that a great load on the electrode may be employed without the phase displacement being too bad. A great deal of the inductive voltage loss is normally caused by the flexible connections which cannot generally be interlaced with the flexible leads to the adjoining electrode.

If desired very short flexible connections allowing some movement of the mould may of course be employed. It may for instance be suitable to let the mould rotate or oscillate.

The application of the invention may in practice be varied within very wide limits. Instead of employing a solid tubular mould, the mould may be divided longitudinally into single parts which may be loosened or tightened relating to each other whereby the pressure on the electrode may be adjusted.

I claim:

1. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing.

2. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing and comprising a plurality of longitudinal metal strips with their adjacent side edges slightly separated, said contact means being firmly attached to the electrode in its baked position and being laterally extensible by the raw electrode mass to form with the electrode a gas-tight contact with the casing and thereby prevent escape of furnace gases between the electrode and its casing and being slidable with the electrode through the casing.

3. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing and comprising a plurality of longitudinal metal strips with their adjacent side edges slightly separated, each of said strips having an inwardly projecting rib, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing.

4. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing, and supporting mechanism for the contact means for controlling the sliding of the contact means suitably connected therewith above the casing and electrode through the casing.

5. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing, and supporting mechanism for the contact means suitably connected therewith above the casing for controlling the sliding of the contact means and electrode through the casing, said supporting mechanism embodying means for exerting downward pressure on the contact means and electrode.

6. The combination of a selfbaking electrode for an electric furnace, an electrode casing therefor which embraces the electrode mass and extends a substantial distance downward therefrom around the baked electrode and which comprises a mold for the electrode, contact means surrounding a major portion of the electrode mass and baked electrode in the casing, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing, and supporting mechanism suitably connected with the casing above the furnace for controlling the position of the casing in relation to the furnace.

7. The combination of a selfbaking electrode for an electric furnace, a water cooled electrode casing therefor which embraces the electrode mass and extends a substantial distance downward therefrom around the baked electrode and which comprises a mold for the electrode, contact means surounding a major portion of the electrode mass and baked electrode in the casing, said contact means being firmly attached to the electrode in its baked portion and being laterally extensible by the raw electrode mass to form with the electrode a gas-tight contact with the casing and thereby prevent escape of furnace gases between the electrode and its casing and being slidable with the electrode through the casing, and supporting mechanism above the furnace for the casing and contact means and electrode, said supporting mechanism embodying means for controlling the sliding of the contact means and electrode through the casing and for controlling the position of the casing in relation to the furnace.

8. The combination of a selfbaking electrode for an electric furnace, a water cooled electrode casing of conductive material therefor which embraces the electrode mass and extends a substantial distance downward therefrom around the baked electrode and which comprises a mold for the electrode, contact means surrounding a major portion of the electrode mass and baked electrode in the casing, said contact means being firmly attached to the electrode in its baked portion and being laterally extensible by the raw electrode mass to form with the electrode a gastight contact with the casing and thereby prevent escape of furnace gases between the electrode and its casing and being slidable with the electrode through the casing, and supporting mechanism above the furnace for the casing and contact means and electrode, said supporting mechanism embodying means for controlling the sliding of the contact means and electrode through the casing, and for controlling the position of the casing in relation to the furnace, said contact means and electrode receiving current through the casing.

MATHIAS OVROM SEM.